July 17, 1923.

C. H. GRAESSER 1,461,730

PRESSURE GAUGE MECHANISM

Filed May 5, 1921     2 Sheets-Sheet 1

Inventor
Carl H. Graesser.
Roberts, Roberts & Cushman
Attorneys

July 17, 1923.
C. H. GRAESSER
1,461,730
PRESSURE GAUGE MECHANISM
Filed May 5, 1921    2 Sheets-Sheet 2
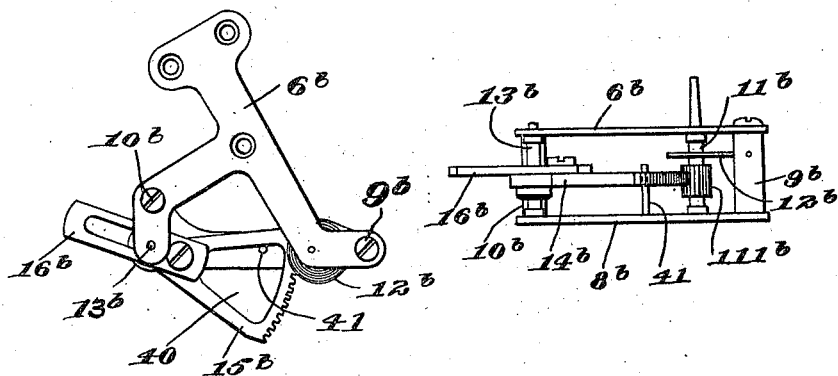
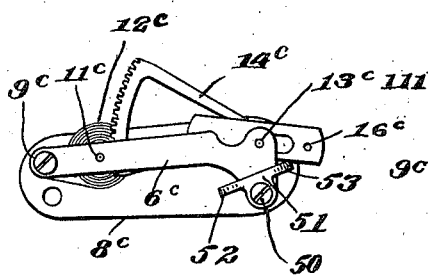
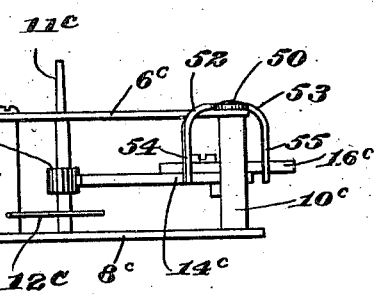
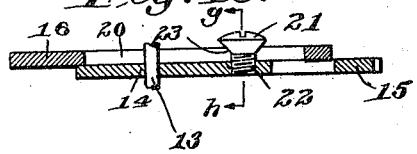
Inventor
Carl H. Graesser.
by Roberts, Roberts & Cushman
Attorneys Patented July 17, 1923.

1,461,730

UNITED STATES PATENT OFFICE.

CARL H. GRAESSER, OF BRIDGEPORT, CONNECTICUT, ASSIGNOR TO MANNING, MAXWELL & MOORE, INC., OF NEW YORK, N. Y., A CORPORATION OF NEW JERSEY.

PRESSURE-GAUGE MECHANISM.

Application filed May 5, 1921. Serial No. 466,952.

*To all whom it may concern:*

Be it known that I, CARL H. GRAESSER, citizen of the United States of America, and resident of Bridgeport, in the county of Fairfield and State of Connecticut, have invented new and useful Improvements in Pressure-Gauge Mechanism, of which the following is a specification.

This invention relates to pressure gauges and the like and more particularly to improved means useful in connection with the transportation of such gauges for guarding them against the injurious effects of accidental shocks or blows.

Pressure gauges of the usual type comprise a Bourdon tube, an index needle, and mechanism intermediate such tube and needle for multiplying and transmitting the movements of the former to the latter. The Bourdon tube commonly consists of a flattened metallic tube bent into the arc of a circle, having one end fixed and communicating with the pressure pipe, and having its free extremity closed and connected by means of a link or otherwise to the transmission mechanism. After the assembling of the gauge, it is carefully adjusted and tested for accuracy, the index needle usually being so positioned as to rest against a fixed stop pin when in initial or zero position. By reason, however, of the supporting of the Bourdon tube at one end only, it is found to be extremely susceptible to the effects of blows or shocks, and the safe transportation of gauges employing such pressure tubes is an exceedingly difficult problem. This difficulty is particularly pronounced in connection with low pressure gauges, such for example as are used in so-called "vapor" heating systems and the like and wherein the Bourdon tube must necessarily be of very thin material. While elaborate and costly attempts have been made to minimize the effects of blows received during transportation, and while to a certain extent such injurious effects have been lessened, it is found that no matter how carefully the manufacturer may pack the gauge for transportation, and regardless of what precautions are observed in the selection of the mode of transportation, a large proportion of gauges arrive at their points of destination with the needle standing at a considerable distance from the stop pin. This condition necessitates the readjustment of the gauge which is a delicate operation, requiring care and skill, and in many instances the purchaser of the gauge, without realizing the true facts of the situation, accuses the manufacturer of carelessness in initially adjusting the instrument, or of failure to observe the proper care in shipping, and demands that the manufacturer replace or repair the defective gauge at his own expense. This condition of affairs is annoying to manufacturer and consumer, and frequently results in loss of business to the manufacturer, even though the latter be using the utmost care and employing expensive forms of packing to insure the safety of his product in transportation.

The principal object of the present invention is to overcome the above difficulties incident to the transportation of instruments of the character referred to, and to provide means, by the employment of which, the safe arrival of the finished and adjusted gauge at its point of destination may reasonably be assured.

As the result of elaborate and carefully conducted tests, it has been ascertained that when the gauge is subjected to shocks or blows, the Bourdon tube, which is relatively thin and resilient, is set into vibration. the plane of vibration varying with the direction of the blow, and the amplitude of its vibration at any point of course varying with the distance of such point from the fixed end of the tube, but being of appreciable amount even at points closely adjacent such end. At its free end the amplitude of vibration of the tube may be very large and the momentum of the connected parts sufficient to produce a permanent deformation or bending of the tube or of such parts, with resultant incorrect setting of the index needle.

While it has been proposed to provide temporary holding or clamping means for preventing movement of the gauge parts during transportation, such means have proven unsatisfactory from a practical standpoint due to the failure of the user to remove such devices in putting the gauge into use, or by reason of carelessness in removing such devices with attendant injury to the gauge mechanism proper. It has been found, moreover, that if it be attempted to limit the vibrational movement of the tube, as for example by the provision of a fixed stop or stops at intermediate points in its length, the other portions of the tube are affected by shocks to nearly the same extent as before, the fixed stops merely acting as node points in the vibrating tube, if the blow comes in a direction transverse to that portion of the tube with which the stop means engage, and permitting the tube to slip by the stop device and take up its full vibration if the blow comes from a direction at right angles thereto. As it is obviously impossible to provide stops at all points in the tube, which would render it useless to perform its intended function, it is clear that such mode of controlling the vibration of the parts is not feasible. Such fixed stops moreover, are found to indent the relatively thin walled tube when the gauge is subjected to a heavy blow, thus impairing the accuracy of the tube and seriously weakening it. Thus the control of the vibrational movement of the tube becomes a difficult matter from a practical standpoint, and in carrying out the above object it has been found advisable to abandon the attempt at direct control of the Bourdon tube and to provide means associated with the movement transmitting mechanism for securing the desired result. Such mchanism commonly comprises a lever member mounted to turn upon a staff and provided with a gear sector at one of its ends and having connections at its opposite end with the free extremity of the Bourdon tube. For the purpose of the present invention, fixed stop means may be provided for limiting the oscillation of such lever in either direction, the stop means being so positioned that the index needle cannot move beyond the limits of the dial scale. With such an arrangement it is found that the vibration of the parts is so damped, and the amplitude of movement thereof is so limited that, while free to perform its proper function, the tube is restrained against excessive movement such as might cause its permanent deformation.

In gauges of this character, as above stated, it is common to employ a lever member as an element of the connecting mechanism between the Bourdon tube and the index. This lever is generally provided at one end with a slidable extension piece which is useful in the initial or subsequent adjustments of the gauge. This extension is formed with a longitudinal slot and is secured in adjusted position by means of a set screw passing through the slot and entering an opening in the main portion of the lever. As the extension slide is mounted upon the short arm of the lever, any inaccuracies in setting of the same are greatly amplified at the index needle, and it is of prime importance, both that the slide be set properly, and that it maintain its position even when the gauge is subjected to blows or vibration.

A further object of the invention is to provide for the accurate and certain positioning of the extension slide and to this end the set screw therefor may be provided with a bevelled shoulder or fillet beneath its head, such shoulder acting automatically to center the slide relatively to the axis of the screw, and by biting into the edges of the slot in the slide, such fillet may serve in an effectual manner to prevent subsequent movement of the slide even though the screw becomes somewhat loosened.

Preferred means for carrying the above invention into effect is illustrated in the accompanying drawings in which,—

Figs. 6 and 7 are a plan and side elevation respectively of a gauge movement illustrating a further modification;

Figs. 8 and 9 are a plan and side elevation respectively of a gauge movement illustrating a still further modification;

Fig. 10 is a fragmentary longitudinal cross section through the lever member of Fig. 1, illustrating improved means useful in the adjustment of a gauge movement; and Fig. 11 is a cross section on the line $g-h$ of Fig. 10, Figs. 10 and 11 being to greatly enlarged scale.

Figure 1:
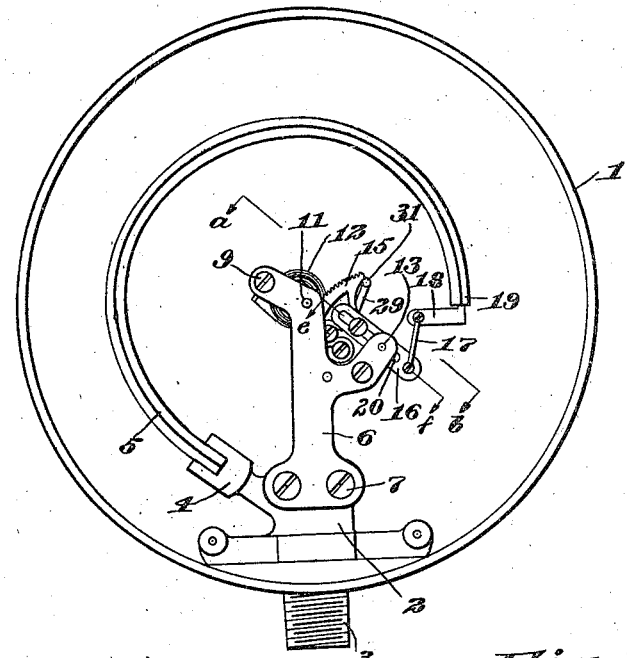
Fig. 1 is a front elevation of a gauge showing the dial and index needle as removed in order more clearly to illustrate the interior mechanism.

Referring to Figs. 1, 2, 3, 10 and 11, the usual gauge casing is indicated at 1, such casing having supported therein a bracket 2 provided with an outwardly projecting screw threaded nipple whereby the gauge may be mounted upon a pressure pipe.

Outstanding from one side of the bracket 2 is an arm 4 which serves to support one end of a pressure tube 5 of the Bourdon type. At 6 is indicated the top plate of a movement supporting frame, such plate being secured by means of screws 7 to the bracket 2. Spaced below the plate 6 is a second plate 8, such plates being held in proper relative position by means of posts 9, 10, respectively. The plates 6 and 8 are provided with aligned openings wherein is journaled an index staff 11 provided with a hair spring 12. Aligned openings are also provided in the plates 6 and 8 wherein is journaled a staff 13 upon which is secured a lever member 14. This lever member is provided at one end with a gear segment 15 having teeth meshing with a pinion 111 carried upon the staff 11. The lever member is also provided with an extension member or slide 16, to the outer extremity of which is secured a link 17 having connection with a bracket 18 mounted upon the free extremity 19 of the pressure tube. The extension slide 16 is provided with a longitudinal slot 20 (Fig. 10) which takes over the staff 13, such staff serving as a guide for the slide member. An adjusting screw 21 passes through the slot 20 and has threaded engagement at 22 with an opening in the main portion of the lever 14. This screw is preferably provided immediately beneath its head with a conical or beveled surface 23, which, when the screw is set up tightly, engages the edges of the slot 20 as indicated at 24, in Fig. 11. This arrangement not only serves to center the slot relatively to the axis of the screw but, if sufficient force be applied, the conical portion of the screw is forced into the material of the edges of the slot, thus forming a seat for the screw which prevents substantial movement of the slide even though the screw becomes somewhat loosened.

Figure 3:
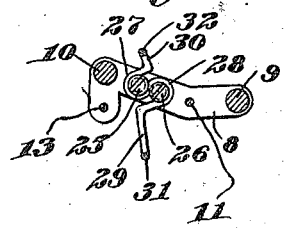
Fig. 3 is a fragmentary horizontal section on the line $c-d$ of Fig. 2.
Figure 2:
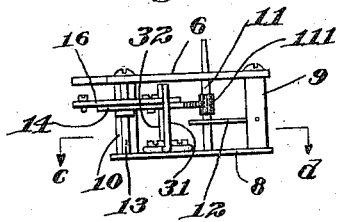
Fig. 2 is a fragmentary vertical section taken on the line $a-b$ of Fig. 1.

As indicated in Fig. 3, the bottom plate 8 is provided with a pair of screws 25, 26, which engage eyes 27, 28, respectively, formed upon the ends of the arm members 29, 30. These arms project in opposite lateral directions from the plate 8 and are provided with upwardly extending members 31, 32, respectively. The members 31, 32 extend transversely of the plane of movement of the sector 15, and are so positioned as to contact with the edges of such sector whereby to limit the movement of the latter in both directions. By securing the arms 29, 30 by means of the eyes and screws, it is readily possible to adjust such arms relatively, one to the other, and to the plate 8 whereby to vary the limits of movement of the sector 15.

Figures 4, 5:
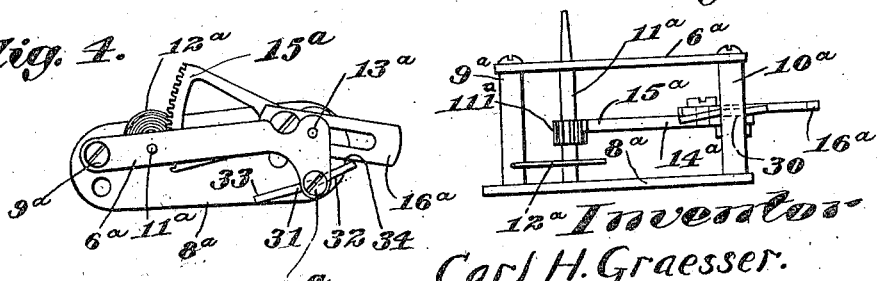
Figs. 4 and 5 are a plan and elevation respectively of the movement of a gauge mechanism, illustrating the application of a modification of the present invention.

In the arrangement shown in Figs. 4 and 5, the movement frame is indicated as comprising a top plate $6^a$ and bottom plate $8^a$ spaced apart by means of posts $9^a$ and $10^a$. The index staff is shown at $11^a$ having the pinion $111^a$ and the hair spring $12^a$. The lever staff is indicated at $13^a$ having the lever $14^a$ mounted thereon, such lever being provided with the sector $15^a$ engaging the pinion $111^a$. The lever is also furnished with an extension slide $16^a$ secured in position by means of a set screw of ordinary form, or of the type hereinbefore described and illustrated in Figs. 10 and 11. In accordance with this modification, the post $10^a$ is provided with a transverse opening at 30 through which extends a pin having the oppositely extending portions 31, 32. These portions provide surfaces 33, 34 respectively which lie in the plane of movement of the main lever member $14^a$ or of the extension member $16^a$, and as the elements 33, 34 are arranged upon opposite sides of the axis $13^a$ about which the lever turns, the single pin serves in an effective manner to limit the lever in either direction of movement. By relatively bending the portions 31, 32 of the pin the limits of movement of the lever may be varied.

In the arrangement indicated in Figs. 6 and 7, the top and bottom plates of the movement supporting frame are indicated at $6^b$, $8^b$, respectively. These plates are held in spaced relation by means of the posts $9^b$, $10^b$ and serve to provide journal bearings for the index staff $11^b$ provided with the hair spring $12^b$ and the pinion $111^b$. The plates also have journaled therein the lever staff $13^b$ having mounted thereon the lever $14^b$ provided with the extension $16^b$ and with the segmental portion $15^b$. The segmental portion is provided with a segmental opening 40 and projecting upwardly from the plate $8^b$ is a pin 41 which lies within the opening 40 and transversely of the plane of movement of the lever. This single pin thus provides for limiting the movement of the lever in opposite directions.

In the arrangement disclosed in Figs. 8 and 9, the top and bottom plates of the movement frame are indicated at $6^c$, $8^c$, respectively, being spaced apart by means of the posts $9^c$, $10^c$. The index staff is indicated at $11^c$ and the lever staff at $13^c$, such lever staff supporting the lever $14^c$ having the extension $16^c$. The upper plate $6^c$ is secured to the post $10^c$ as by means of a screw 50 and interposed between the head of such screw and the upper surface of the plate $6^c$ is a plate 51. Extending in opposite directions from the central portion of the plate 51 are integral arms 52, 53 which are bent downwardly to provide the members 54, 55 which lie substantially parallel to the axis of the staff $13^c$ and which are arranged for contact respectively with the opposite edges of the lever $14^c$ or of the extension member $16^c$. The plate 51 with the members 52, 53, 54, 55 may be formed as a single stamping and bent into suitable form either before or after mounting upon the frame. As the arms 54, 55 may be bent independently one of the other, it is possible with this arrangement to provide independent adjustment of the limits of movement of the lever device.

With all of the various arrangements disclosed, it is evident that the movement of the lever is limited in either direction, and as this lever serves to drive the index needle it is clear that the latter is also positively limited in its movement. As the lever is connected to the pressure tube by means of the link 17 and bracket 18, the tube has a considerable freedom of movement relative to the lever and after the stopping of the lever at either limit of its movement it is still possible for the pressure tube to vibrate to a slight extent, the vibration, however, being damped by the connection of the free end of the tube to the lever so that upon stopping of the lever by engagement with either of the stop elements any substantial and injurious vibration of the tube is prevented. Thus accidental blows or shocks to the gauge casing fail to cause permanent injury to the tube or the gauge movement, or to impress upon such parts a permanent set such as to require readjustment of the lever slide or of the index needle. The employment of the special form of adjusting screw also conduces to permanency or adjustment of the gauge parts in the manner above pointed out, and is found to be of particular value in connection with a gauge provided with the stop members as above described, as with such a gauge, the initial setting of the parts is usually sufficient and no further adjustment is necessary.

Having thus described the invention in a preferred embodiment of the same together with the mode of functioning thereof, what I claim and desire to secure by Letters Patent of the United States is:

1. A gauge comprising a casing, a Bourdon tube therein, index means, a lever interposed between said tube and said index means, and spaced stop elements engageable with said lever for positively limiting the arc of movement thereof.

2. A gauge comprising a Bourdon tube, an index needle, and connecting mechanism between said tube and needle, said mechanism comprising a lever member, and adjustably fixed elements engageable with said lever at opposite sides of its axis whereby to limit its arc of movement.

3. A gauge having a Bourdon tube, an index, and connecting mechanism therebetween, said mechanism comprising a lever member, and a pair of relatively adjustable and detachable stop members secured to a fixed support and arranged to engage opposite lateral edges of said lever member whereby to limit its movement in either direction.

4. A gauge having a Bourdon tube and a movement frame comprising a supporting plate, a lever member, and a pair of stop members each having an eye at one of its extremities, means engaging the respective eyes for securing said members to the plate, said members being provided with outstanding arms arranged respectively for engagement with opposite edges of the lever member whereby to limit the movement of the same in either direction.

5. A gauge mechanism comprising a lever and an adjustable extension slide therefor having a parallel walled slot therein, and means engageable with the lever and provided with an element constructed and arranged to bite into the edges of said slot whereby to retain said slide firmly in adjusted position.

6. A gauge mechanism having a lever, an extension slide for said lever, said slide having a longitudinally extending, parallel walled slot therein, and a set screw engaging the slot in said slide and having threaded engagement with the lever, said screw having a head, and substantially conical fillet beneath the head.

Signed by me at Bridgeport, Connecticut this 2nd day of May, 1921.

CARL H. GRAESSER.